United States Patent
Riffil et al.

[19]

[11] Patent Number: 5,866,862
[45] Date of Patent: Feb. 2, 1999

[54] VEHICLE POSITIONING CONTROL

[75] Inventors: Robert C. Riffil, Allen Park; Joseph M. Hayes, W. Bloomfield, both of Mich.

[73] Assignee: UT Automotive Dearborn, Inc., Dearborn, Mich.

[21] Appl. No.: 833,442

[22] Filed: Apr. 7, 1997

[51] Int. Cl.⁶ .................................................. H01H 9/00
[52] U.S. Cl. .......................... 200/5 R; 307/10.1; 361/728
[58] Field of Search .................... 200/5 R, 18, 293–295; 307/10.1; 318/568.1; 361/728, 760; 701/49

[56] References Cited

U.S. PATENT DOCUMENTS

| | | | |
|---|---|---|---|
| 4,698,571 | 10/1987 | Mizuta et al. | 318/568 |
| 4,706,194 | 11/1987 | Webb et al. | 364/424 |
| 4,788,447 | 11/1988 | Kiyono et al. | 307/10.1 |
| 4,845,620 | 7/1989 | Parker | 364/424.05 |
| 5,040,990 | 8/1991 | Suman et al. | 439/34 |
| 5,197,007 | 3/1993 | Parker | 364/424.05 |
| 5,283,473 | 2/1994 | Furuse et al. | 307/10.6 |
| 5,384,440 | 1/1995 | Wnuk et al. | 200/5 R |
| 5,475,592 | 12/1995 | Wnuk et al. | 364/424.05 |
| 5,581,130 | 12/1996 | Boucheron | 307/10.1 |
| 5,612,577 | 3/1997 | Schmidt et al. | 307/10.1 |
| 5,668,357 | 9/1997 | Takiguchi et al. | 200/5 R |

FOREIGN PATENT DOCUMENTS

| | | | |
|---|---|---|---|
| 4034529 | 7/1992 | Germany | B60R 16/02 |
| 4034561 | 7/1992 | Germany | B60R 16/02 |
| 4403073 | 11/1994 | Germany | G05D 16/00 |

*Primary Examiner*—Michael A. Friedhofer
*Attorney, Agent, or Firm*—Emch, Schaffer, Schaub & Porcello Co., L.P.A.

[57] ABSTRACT

A vehicle positioning switch such as a power seat switch is disclosed that combines two separate switch packages (seat switch and memory seat switch) into one switch package without significantly changing the seat switch package size. This simplifies wiring complexity, packaging and reduce costs to the customer and manufacturer. The switch is the integration of a memory seat switch into an eight way seat switch package. By mounting three tact switches to a memory PC board and attaching the PC board assembly to the front cover, separate memory functions are integrated into the seat switch package. The front cover now also serves as the guidance system for the memory buttons. The PC board is connected to the electrical distribution system by a wire harness that is routed around the actuator plate and circuit plate of the manual switch and connected directly to a motor control module.

12 Claims, 4 Drawing Sheets

VEHICLE POSITIONING CONTROL

TECHNICAL FIELD

This invention relates to a vehicle positioning control such as an automotive power seat switch. More particularly, the control includes manual switches and memory switches.

BACKGROUND OF THE INVENTION

Providing a memory function to vehicle component positioning systems has gained wide acceptance in recent years. The memory function allows a particular rider to tailor the position of a vehicle component, such as the seat, mirrors, etc. to the position desired for that individual. The memory system will typically allow selection and storage of desired positions for at least two individuals.

While memory functions are gaining wide acceptance, the optional provision of the memory function complicates assembly. Positioning systems that do not include the memory function must still be provided. The memory function is typically provided as an option, and a large percentage of the positioning systems are still assembled without the memory function.

Older prior art controls used to provide the memory function include a separate memory positioning control in addition to a non-memory positioning control. Different tooling and assembly steps must be made available to the assembler for incorporation of the non-memory and the memory controls.

More recent developments provide an optional memory function by a universal positioning switch control board which also controls the manual positioning function. The control board incorporates a circuit board that may optionally receive a piggy-back memory pack. The control board includes connections to be connected to a wire harness extending between the control board and the positioning motor control. The memory pack is attached to the same circuit board that controls the manual switch. Memory signals pass from the memory switch through the circuit board to the motor control. The memory pack plugs into a well adjacent to the manual positioning switch. When the memory option is not utilized, a cover for the manual switch covers and encloses the well.

This arrangement, while being an improvement, still requires positioning switch controls which are not easily pre-assembled. The switch still requires a number of tools and distinct assembly steps. The manual switch circuit board also must be modified to receive the piggy-back memory pack. See U.S. Pat. No. 5,475,592.

DISCLOSURE OF INVENTION

We have developed a power seat switch that combines two separate switch packages (seat switch and memory seat switch) into one switch package without significantly changing the seat switch package size. This simplifies wiring complexity, packaging and reduce costs to the customer and manufacturer. Our invention is the integration of a memory seat switch into standard power seat switch. By mounting three tact switches to a memory PC board and attaching the PC board assembly to the front cover, we allow separate memory functions to be integrated into the seat switch package. The front cover now also serves as the guidance system for the memory buttons. The PC board is connected to the electrical distribution system by a wire harness that is routed around the actuator plate and circuit plate of the manual switch. The memory power feed is spliced into the seat switch power feed and the outputs are wired directly to a motor control module. To accommodate the memory functions and the wire routing, the standard circuit plate seat switch was increased by 3 mm in length. Our arrangement eliminates the piggy back memory pack of the prior art. Our arrangement also is routed around the circuit board of the manual switches and connected directly to the electrical distribution system thereby simplifying the one switch package.

BEST MODE OF CARRYING OUT INVENTION

Figure 1:
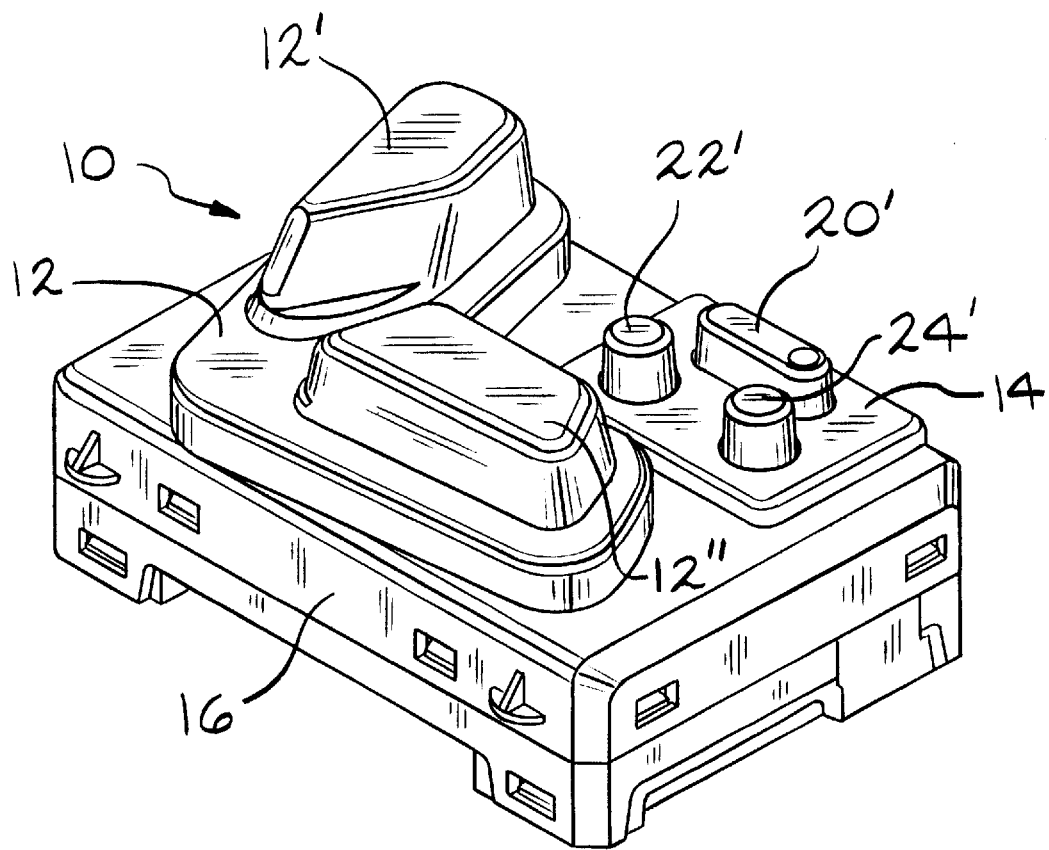
FIG. 1 is a perspective view of the seat switch assembly of the present invention.

FIG. 1 shows seat switch 10 as it would appear to an occupant of a vehicle. One can mount switch 10 on the side of a seat, door panel, arm rest or consul as desired for flexible assembly of the vehicle. Switch 10 comprises L-shaped manual switch 12 and memory switch 14, both mounted in front cover 16. Front cover 16 defines openings 18 beneath manual switch 12. Switch 12 includes knobs 12' and 12" for operating switch 12. Memory switch 14 defines openings 20, 22 and 24 for housing set button 20' and two memory buttons 22' and 24'.

Figure 2:
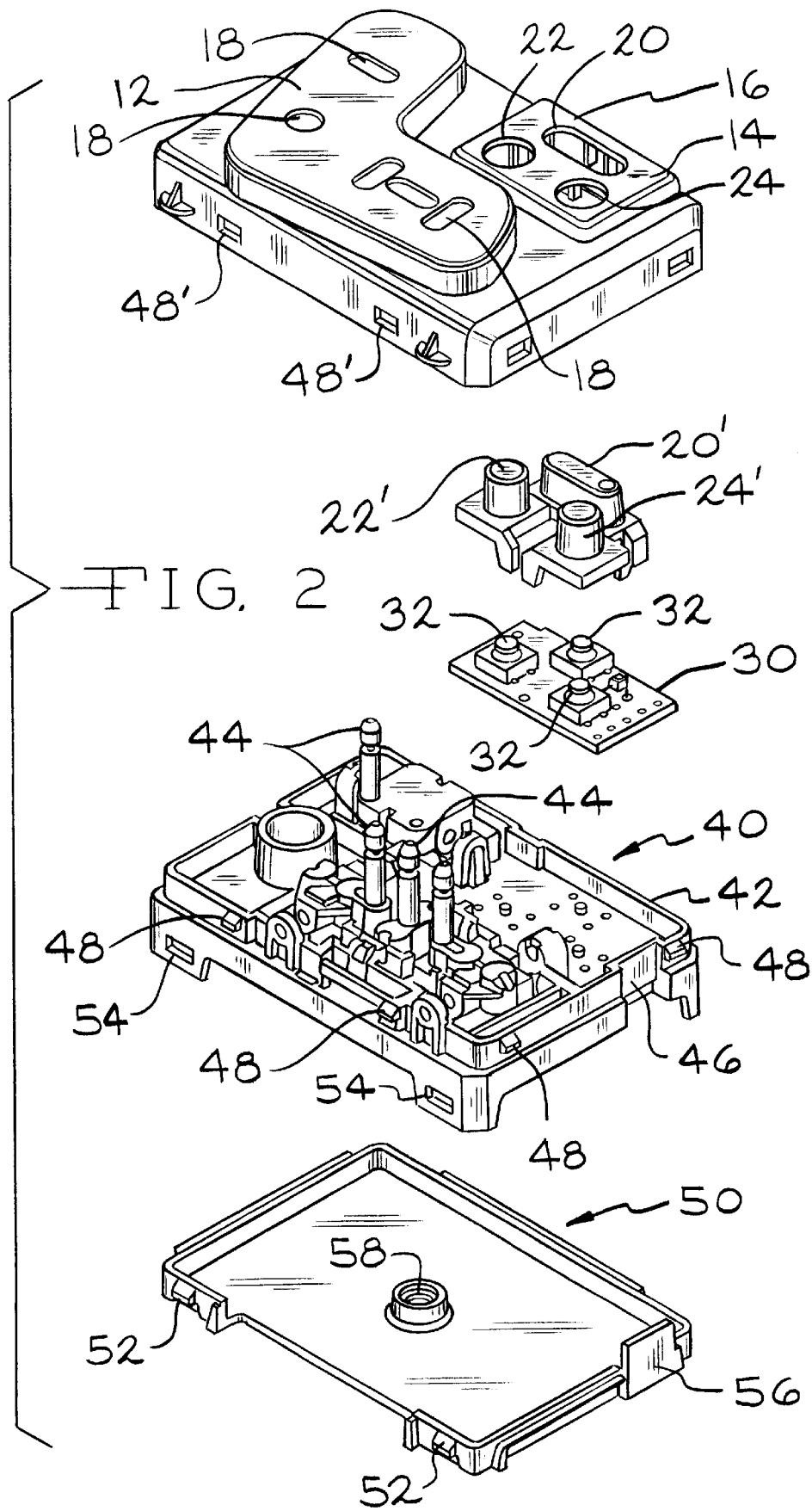
FIG. 2 is an exploded perspective view of the switch assembly of FIG. 1.

FIG. 2 is an exploded view showing switch 10 in unassembled form. A key to this invention is the unitary construction of front cover 16. Another key to this invention is the mounting of memory control PC board 30 to the back side of front cover 16. Still another key is the mounting of tact switches 32 to board 30. Board 30 is mounted to the back side of cover 16 so that tact switches 32 are sandwiched between board 30 and cover 16. Board 30 is mounted below switch 14 so that buttons 20', 22' and 24' are adjacent tact switches 32. An occupant of the vehicle merely depresses buttons 20', 22' and 24' respectively to make contact with a switch 32.

Assembly 40 lies beneath cover 16 and comprises actuator plate 42 and manual control board 62. Plates 42 also defines channel 46. Channel 46 allows a wire harness (not shown) to route around assembly 40 so that board 30 may by-pass assembly 40. This allows for board 30 to be wired directly to motor control module 70 after. The circuit plates or boards 30 and 62 may be any circuit board used in vehicle applications. See U.S. Pat. No. 5,612,577 issued Mar. 18, 1997. This patent discloses circuit board 56 which we can use in this invention. Circuit board 56 of U.S. Pat. No. 5,612,577 is a symmetrical circuit board for vehicle switching requirements such as manual switch 12 of this invention. The circuit plate also may be the same as circuit board 39 in FIG. 3 of U.S. Pat. No. 5,475,592.

Figure 4:
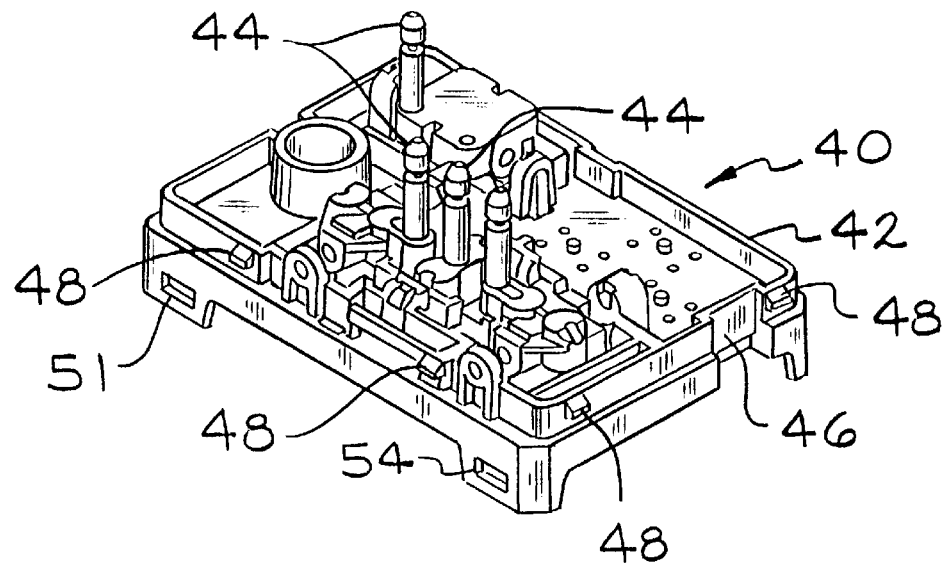
FIG. 4 is an exploded perspective view showing the actuator plate, the manual control board and motor control module of the switch assembly of FIG. 1.
Figure 4:
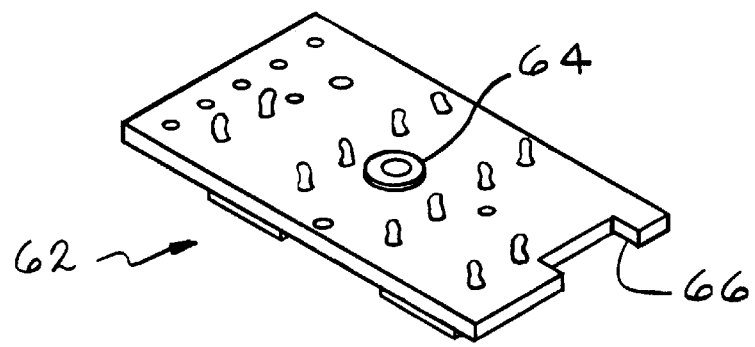
Figure 4:
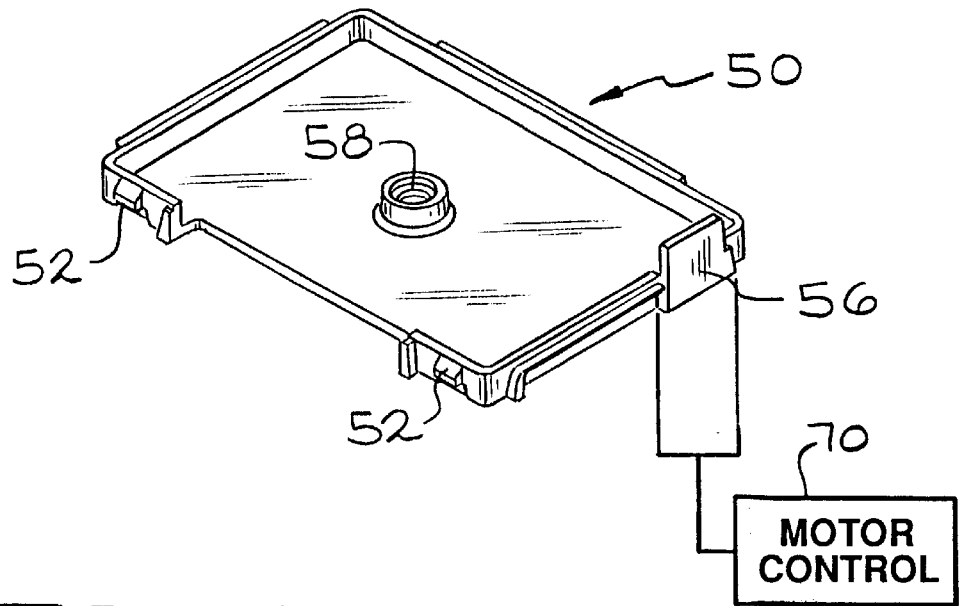

FIG. 4 shows assembly 40 in greater detail with manual control board 62 positioned between actuator plate 42 and back cover 50. Manual control board includes orifice 64 and channel 66. Manual control board 62 defines channel 66 for by-passing the connections between memory control board 30 and motor control module 70. Actuator plate 42 is between manual control board 62 and front cover 16.

Front cover 16 snaps into actuator 42 using snaps 48 and corresponding slots 48'. This locks actuator plate 42 to front cover 16. Back cover 50 in turn snaps into plate 42 using snaps 52 and slots 54 and traps the manual switch circuit plate therebetween. Cover 50 also includes tab 56 which cover channel 46 and channel 66. Tab 56 thus protects the wire harness connecting board 30 to its connector. Additionally, back cover 50 includes orifice 58. A screw (not shown) than passes through orifice 58 and orifice (not shown) in plate 42, orifice 64 of circuit board 66 and orifice 60 in cover 16 thus providing additional security and safety against disassembly.

Figure 3:
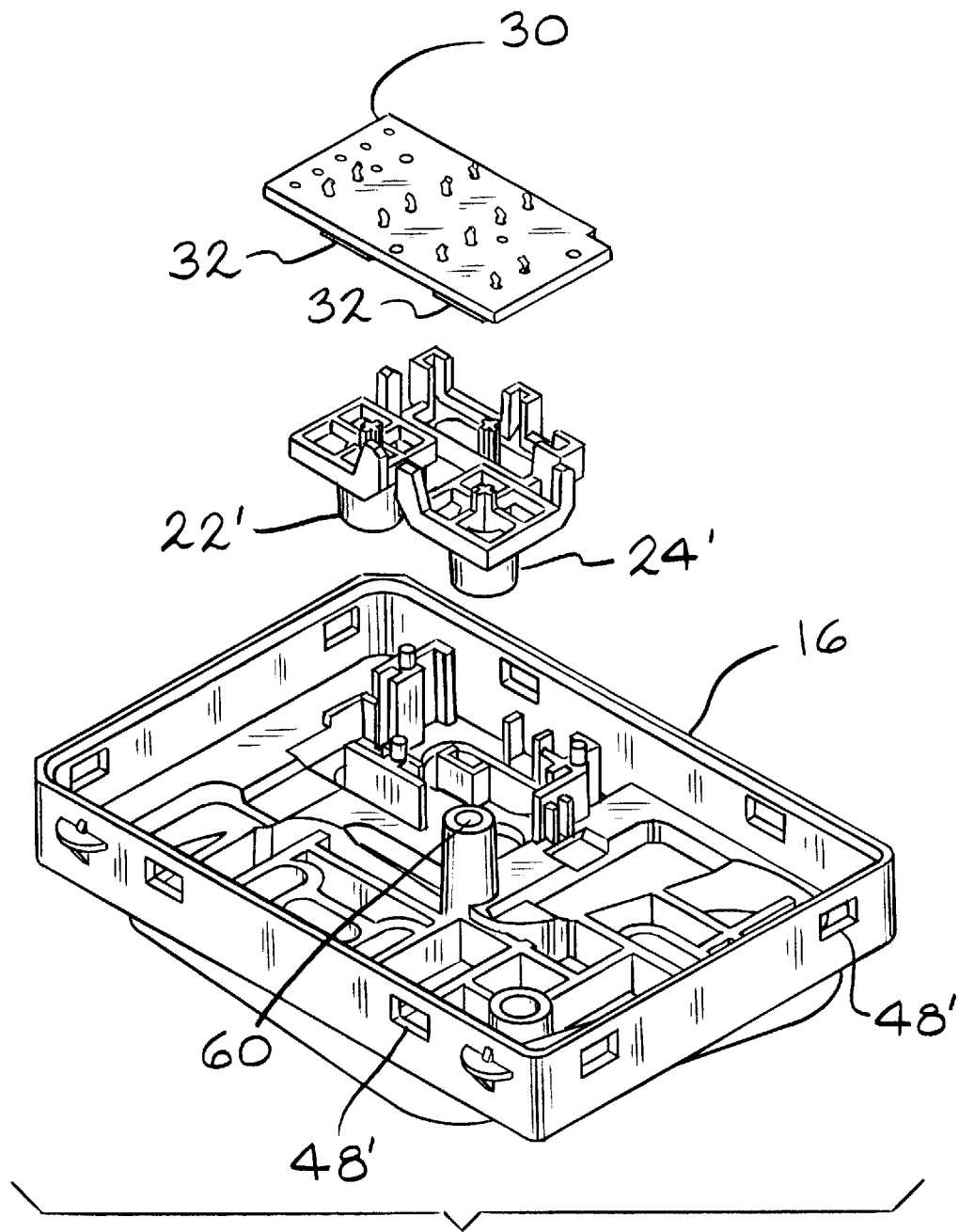
FIG. 3 is an exploded perspective view of the memory PC board, memory buttons and bottom side of the front cover of the switch of FIG. 1.

FIG. 3 shows the back side of front cover 16, board 30, buttons 20', 22' and 24' and threaded orifice 60. FIG. 3 shows how board 30 and buttons 20', 22' and 24' nest in cover 16 and are aligned adjacent to each other for engagement. Snapping cover 16 into plate 42 locks the arrangement into place.

Openings 18 in manual switch 12 allow knobs 12 to be adjacent actuator plate 42. When engaged knobs 12' make contact with circuit elements 44 mounted on actuator plate 42. Elements 44 contact connectors (not shown) within the circuit board as shown in FIG. 1B of U.S. Pat. No. 5,612,577. This arrangement thereby connects switch 12 to a vehicle wire harness to thereby electrically connect the switch to a seat control module. The seat control module then activates seat positioning motors. In the same fashion, memory switch 14 through board 30 connects to a connector (not shown). The connector thereby connects switch 14 to a vehicle wire harness to thereby electrically connect the switch to a seat control module. The seat control module then actuates a seat positioning motor. The connectors and seat control module for switches 12 and 14 can be the same or two separate functions. The key is for connection from board 30 to by-pass the circuit board for manual switch 12.

Memory circuit board 30, connectors, wire harnesses, controllers, seat positioning motors and the like which are not part of this invention, are disclosed in U.S. Pat. Nos. 5,612,577, 5,475,592 and 5,197,007 as well as other patents.

The switch functions operates as in the prior art. The manual switch takes the shape of a vehicle seat, and generally is L-shaped. The memory function also operates as in the prior art. An operator can manually position a component, such as a seat, mirror, etc., to a desired position, and then set that position with a desired memory signal. The memory associates that position with a particular memory signal. When a memory signal is sent to the motor control module, the motor control module moves the component to the desired memory position. A typical power seat switch in which use our invention is an eight way seat switch.

We claim:

1. A vehicle component positioning control comprising:

at least one motor control module for positioning a vehicle component;

a manual control board having a manual switch, and connections to communicate signals from the manual control board to the motor control module;

a one-piece front cover having an outer surface and an inner surface;

a memory control board having a memory switch and connections to communicate signals from the memory control board to the motor control module;

the one-piece front cover housing the manual switch and the memory switch;

the memory control board being located adjacent the inner surface of the front cover; and the connections from the memory control board to the motor control module by-passing the manual control board.

2. A control according to claim 1, wherein the memory control board is attached to the inner surface of the front cover.

3. A control according to claim 1, wherein the memory switch is a plurality of memory buttons and a portion of the front cover defines cavities which house and serve as a guidance system for the memory buttons.

4. A control according to claim 3, wherein the memory control board includes tact switches located adjacent and beneath the memory buttons.

5. A control according to claim 1, wherein a portion of the manual control board defines a channel for by-passing the connections between the memory control board and the motor control module.

6. A control according to claim 1, wherein the control includes an actuator plate between the manual control board and the front cover.

7. A control according to claim 6, wherein the manual control board and the actuator plate define a channel housing the connection between the memory control board and the motor control module.

8. A control according to claim 7, including a back cover which sandwiches the manual control board between the actuator plate and the back cover.

9. A control according to claim 8 wherein the back cover includes a tab which is adjacent the channel thereby protecting the connections therein.

10. A control according to claim 1 wherein the manual control board and the memory control board connect to a single motor control module.

11. A vehicle component positioning control comprising:

at least one motor control module for positioning a vehicle component;

a manual control board having a manual switch, and connections to communicate signals from the manual control board to a motor control module, wherein the manual control board defines a channel;

a one-piece front cover having an outer surface and an inner surface;

a memory control board having a memory switch and connections to communicate signals from the memory control board to the motor control module;

the one-piece front cover housing the manual switch and the memory switch;

the memory control board being located adjacent the inner surface of the front cover; and the connections from the memory control board to the motor control module routing around the manual control board through the channel defined therein.

12. A control according to claim 11, wherein the control includes an actuator plate between the manual control board and the front cover, wherein the actuator plate also defines a channel for routing the connections between the memory control board and the motor control module around the actuator plate.

\* \* \* \* \*

UNITED STATES PATENT AND TRADEMARK OFFICE
CERTIFICATE OF CORRECTION

PATENT NO. : 5,866,862
DATED : February 2, 1999
INVENTOR(S) : Robert C. Riffil and Joseph M. Hayes It is certified that error appears in the above-indentified patent and that said Letters Patent is hereby corrected as shown below:

Column 2, line 48:   "Plates" should be --Plate--.
Column 2, line 52:   "module 70 after." should be --module 70.--
Column 4, line 26:   "connection" should be --connections--.

Signed and Sealed this

Eighth Day of June, 1999

Attest:

Q. TODD DICKINSON

Attesting Officer

Acting Commissioner of Patents and Trademarks